(12) United States Patent
van der Knaap

(10) Patent No.: US 7,845,660 B2
(45) Date of Patent: Dec. 7, 2010

(54) ANTI-ROLL/PITCH SYSTEM FOR USE IN A VEHICLE AND VEHICLE EQUIPED WITH SUCH SYSTEM

(75) Inventor: Albertus Clemens Maria van der Knaap, Helmond (NL)

(73) Assignee: Nederlandse Organisatie voor toegepast-natuurwetenschappelijk Onderzoek TNO, Delft (NL)

( * ) Notice: Subject to any disclaimer, the term of this patent is extended or adjusted under 35 U.S.C. 154(b) by 647 days.

(21) Appl. No.: 11/660,529

(22) PCT Filed: Aug. 19, 2005

(86) PCT No.: PCT/NL2005/000604

§ 371 (c)(1), (2), (4) Date: May 14, 2007

(87) PCT Pub. No.: WO2006/019298

PCT Pub. Date: Feb. 23, 2006

(65) Prior Publication Data

US 2007/0252350 A1    Nov. 1, 2007

(30) Foreign Application Priority Data

Aug. 20, 2004    (EP) .................................. 04077360

(51) Int. Cl.
*B60G 17/02* (2006.01)
(52) U.S. Cl. ............................. 280/124.106; 280/5.506; 280/5.508; 280/124.134; 280/124.145; 280/124.179; 296/190.07; 248/578; 248/624

(58) Field of Classification Search .......... 280/124.106, 280/5.506–5.509, 5.513, 124.134, 124.145, 280/124.179; 248/560, 575, 578, 618, 624, 248/611; 267/174, 175; 296/190.04–190.07
See application file for complete search history.

(56) References Cited

U.S. PATENT DOCUMENTS

| 2,885,217 A | 5/1959 | Felburn |
| 4,277,085 A | 7/1981 | Bryansky et al. |
| 6,056,303 A * | 5/2000 | van der Knaap et al. . 280/124.1 |

FOREIGN PATENT DOCUMENTS

| DE | 2538103 | 3/1977 |
| DE | 3707085 | 9/1987 |
| DE | 3718390 | 12/1987 |

(Continued)

*Primary Examiner*—Ruth Ilan
(74) *Attorney, Agent, or Firm*—Hoffman & Baron, LLP

(57) ABSTRACT

The invention relates to an anti-roll/pitch system for use in a vehicle, in which a first mass, for instance a cabin, is suspended to a second mass, for instance a chassis, by means of a bearing arm, which is pivotally connected to the second mass around a pivot axis, via spring means. The anti-roll/pitch system comprises means to adjust a point of application of a spring force acting on the bearing arm, so as to adjust a moment exerted by said spring force on said bearing arm to counteract a load exerted on the bearing arm by the first mass. The spring force is exerted on the bearing arm through a flexible, elongated member, such as a string or cable, which takes up little space when adjusting the point of application. The invention furthermore relates to a built-in unit and a vehicle, equipped with an anti-roll/pitch system according to the invention.

14 Claims, 3 Drawing Sheets

FOREIGN PATENT DOCUMENTS

| | | |
|---|---|---|
| DE | 10105300 | 8/2002 |
| EP | 0639123 | 8/1997 |
| FR | 1503032 | 11/1967 |
| FR | 1573973 | 7/1969 |
| GB | 159622 | 3/1921 |
| GB | 2319760 | 6/1998 |
| WO | WO9322150 | 11/1993 |
| WO | WO9901305 | 1/1999 |

\* cited by examiner

ANTI-ROLL/PITCH SYSTEM FOR USE IN A VEHICLE AND VEHICLE EQUIPED WITH SUCH SYSTEM

This application is the U.S. National Phase of, and Applicants claim priority from, International Application Number PCT/NL2005/000604 filed 19 Aug. 2005 and European Patent Application bearing Serial No. EP 04077360.8 filed 20 Aug. 2004, which are incorporated herein by reference.

BACKGROUND OF THE INVENTION

The invention relates to an anti-roll/pitch system for use in a vehicle, in which a first vehicle mass, for instance a wheel or cabin, is suspended to a second vehicle mass, for instance a chassis, by means of a bearing arm, which is pivotally connected to said second mass around a pivot axis by means of spring means, the anti-roll/pitch system comprising adjusting means, for adjusting a point of application of a spring force on the bearing arm relative to the pivot axis, thereby adjusting a moment exerted by said spring force on said bearing arm, so as to counteract a load, exerted on the bearing arm by the first vehicle mass.

Such an anti-roll/pitch system is known from EP 639123. With this known system, rolling and pitching motions of the cabin or chassis, caused by acceleration and/or deceleration of the vehicle during use, can be effectively counteracted, thereby enhancing the vehicle's safety, comfort, and steering behavior. The system can also successfully be applied as a load leveling system, to compensate for an unequal load distribution on the vehicle, by adjusting the (static) spring forces of the anti-roll/pitch system appropriately.

A disadvantage of this known anti-roll/pitch system, however, is that it is rather voluminous and uses a relative large number of moving components and bearings, rendering the system rather complex, expensive and maintenance demanding.

SUMMARY OF THE INVENTION

It is therefore an object of the invention to provide an improved anti-roll/pitch system, of less complex, more compact design. To that end, a system according to the invention is provided with a flexible, elongated member, such as a string or cable, to transfer the spring force onto the bearing arm. Consequently, when adjusting the point of application of said spring force along the bearing arm, the spring means do not have to be moved. It suffices to move the elongated member or at least an end thereof, connected to the bearing arm. Since this elongated member can be of much smaller cross sectional dimensions than the spring means, it will be clear that its movement will occupy considerably less space than when the spring means were to be moved. Moreover, thanks to its flexibility, the elongated member can be directly coupled to the bearing arm, without special connecting pieces, which would add to the complexity of the configuration. Also, the elongated member offers the freedom to mount the spring means at a location remote from the bearing arm, where there is sufficient space. The elongated member can thus be used to 'transport' the spring dynamics to the bearing arm, possibly in cooperation with guiding means.

Such guiding means can guide the member along a predetermined path, which path may require the elongated member to make one or more bends, so as to circumvent possible obstacles blocking its way.

In a preferred embodiment, an anti-roll/pitch system according to the invention includes a counteracting moment on the bearing arm that can be adjusted by moving the elongated member along the circular path. The circular path enables the system to adjust the counteracting moment over a relatively large range, while maintaining a relatively compact configuration, as the spring means can maintain a substantially stationary position, and the elongated member, for making its movement, will only require a relatively small disc or cone shaped space. Moreover, the circular movement can be readily imposed onto the elongated member, for instance by connecting a free end of said member to a swivel arm or disc, which is rotatably connected to the bearing arm, around a third pivot axis.

In a preferred embodiment, the spring means may be arranged such that a centre line thereof extends in line with the flexible elongated member for at least one position of said elongated member. Thanks to such alignment the elongated member can be substantially free of bends. This may help to reduce wear and prolong lifetime of the elongated member. It furthermore can reduce the system size even further.

Preferably, the abovementioned alignment occurs for the position assumed by the flexible, elongated member under static load conditions, as this, under normal conditions, will be the position most frequently assumed by the elongated member. Alternatively, the orientation of the spring means and/or the guiding means is adaptable, so that said orientation can be adjusted to have the centre line of the spring lie in line with the flexible elongated member as much as possible.

Preferably, the centre line of the circular path traveled by the elongated member end extends substantially perpendicular to the plane of the bearing arm.

Such orientation too can contribute to a more compact system and furthermore allows the spring force to engage the bearing arm at a convenient angle, so that a relatively large component of said force will contribute to the actual counteracting moment.

In a further elaboration said third axis extends preferably somewhat halfway the bearing arm's length, so that the circular path can have a radius which substantially corresponds to half of said bearing arm's length. This allows the point of application of the spring force to be adjusted along substantially the entire length of the bearing arm, thus maximizing the adjustment range of the counteracting moment.

In a further preferred embodiment, the abovementioned swivel arm or disc can be driven by for instance a piston or a driving shaft of an electromotor, wherein the latter may be equipped with a cross roller bearing or comparable bearing, to withstand axial, radial and/or bending forces, which during use may be exerted on the driving shaft by the elongated member. In this way, a highly compact anti-roll/pitch mechanism can be configured, of simple and robust design, with a minimum of moving components, yet good adjustability of the counteracting moment.

In a highly preferred embodiment, the drive means can be provided with an overload protection, designed to block rotation of the help arm or disc when a load on the motor exceeds a certain, predetermined value. Thanks to such feature, energy consumption can be reduced and the drive means can be prevented from becoming over heated. This is explained as follows. During use, due to dynamic loading, the spring means and consequently the bearing arm will oscillate around its second pivot axis. As the rotation angle of the bearing arm varies, the orientation of the spring force acting thereon will vary as well, causing certain components thereof to increase, notably the ones that counteract the force needed from the drive means to realize the required adjustment. Hence, the required adjustment effort and energy will increase. Thanks to the overload protection, the adjustment action of the drive means can be temporarily shut down until the rotation angle of the bearing arm returns in an acceptable working range. As long as the drive means are shut down, the bearing arm and spring means will act as a 'normal' suspension, i.e. without active roll and/or pitch compensation.

In a further preferred embodiment, the static spring force (that is the force generated in the elongated member during static loading) is adjustable. This renders the anti-roll/pitch system applicable in different vehicles, having different load capacities. It also allows the anti-roll/pitch systems to be fine-tuned, so that under static load conditions, with the anti-roll/pitch system assuming a neutral position and the bearing arm extending substantially horizontally, the spring force acting on the bearing arm can be adjusted such that the load of the first vehicle mass and possible unbalances therein, are counter acted.

The invention furthermore relates to a built-in unit. Thanks to such a built-in unit, alignment of the spring with regard to the bearing arm, and pre-tensioning of the elongated member can be done by specialists, before mounting the unit into the vehicle. The mounting itself will require little expertise. It suffices to attach the subframe of the unit to a first vehicle mass, for example the chassis, and connect the free end of the bearing arm to a second vehicle mass, for instance a wheel or the cabin. Also, with such a built-in unit, existing vehicles can be easily provided with an anti-roll/pitch system according to the invention. Moreover, when the antiroll/pitch system features a defect, the whole unit can be simply replaced by a new unit, and the defect unit can be send off for repair.

The invention furthermore relates to a vehicle equipped with an anti-roll/pitch system. Thanks to its compactness, the system can be applied in virtually every vehicle 1. Moreover, the system is fit to be applied both in a primary suspension (between the chassis and the wheels) and a secondary suspension (between the chassis and the cabin). Of course, application with only one of these suspensions is also possible.

Further advantageous embodiments of an anti-roll/pitch system according to the invention, as well as a vehicle equipped therewith are set forth in the dependent claims.

BRIEF DESCRIPTION OF DRAWINGS

To explain the invention, exemplary embodiments thereof will hereinafter be described with reference to the accompanying drawings, wherein.

DETAILED DESCRIPTION OF THE INVENTION

Figure 1A:
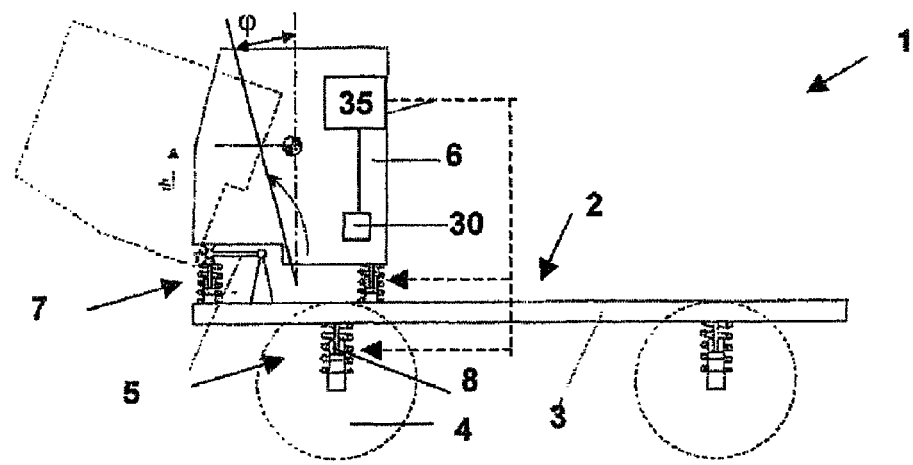
FIGS. 1A,B show, in respective side and top plan view, a vehicle equipped with an anti-roll/pitch system according to the invention.

In this description, identical or corresponding parts have identical or corresponding reference numerals.

FIGS. 1A,B schematically show a vehicle 1 comprising a chassis 2, built of two elongated, parallel U-beams 3, supported by a series of wheels 4 via a primary suspension 5, and a cabin 6, supported by the chassis 2 via a secondary suspension 7. The suspensions 5, 7 comprise spring means 8 and damping means 9, designed to isolate the cabin 6 from vibrations, which during use may occur in the vehicle 1, for instance when passing irregularities in a road surface. To effectively suppress these vibrations, the spring stiffness of the spring means 8 ideally should be low. However, such a low spring stiffness will be accompanied by relatively large pitching motions of the cabin 6 during acceleration and deceleration of the vehicle 1 (i.e. back- and forward rotations of the cabin 6 as indicated by angle φ in FIG. 1A) as well as relatively large rolling motions of the cabin 6 during negotiating of bends (i.e. sideward rotations of the cabin 6, as indicated by angle γ in FIG. 1B). To minimise such uncomfortable pitching and rolling motions, the spring stiffness should be high. In a vehicle 1 according to the invention, these contradictory requirements regarding the spring stiffness are met by providing the primary and/or secondary suspension 5, 7 with an anti-roll/pitch system 10 of which an effective spring stiffness and an effective spring force (i.e. the spring stiffness and spring force as perceived at the sprung mass, e.g. the cabin 6, or the wheels 4) can be actively and dynamically adjusted, depending on the external load acting on the vehicle 1. This will be explained in further detail with regard to FIG. 2, presenting a first embodiment of a secondary suspension 7 with integrated anti-roll/pitch system 10 according to the invention, hereinafter simply referred to as 'suspension 7,10'.

The suspension 7,10 comprises a bearing arm 12, which at one end is pivotally connected to a first vehicle mass, here: cabin 6, around a first pivot axis $R_1$ and with its opposite end is pivotally connected to a first leg 13A of an L-shaped subframe 13, around a second pivot axis $R_2$. This subframe 13 is with said first leg 13A fixedly attached to a second vehicle mass, here: chassis beam 3, whereby a second leg 13B of the subframe 13 extends substantially horizontally, above the bearing arm 12. In the illustrated embodiment, the bearing arm 12 is configured as a linkage triangle. It will be understood that in alternative embodiments, the arm 12 can be configured differently, for instance as a linkage rectangle or T-shaped rod. The arm 12 has a length L (as measured between the first and second pivot axes $R_{1,2}$).

The suspension 7,10 furthermore comprises a spring 8, which is mounted on top of the second leg 13B of the subframe 13, wherein a centre line S of the spring 8 extends substantially perpendicular to said leg 13B, and intersects the bearing arm 12 approximately halfway its length L. According to the invention, the spring 8 is connected to the bearing arm 12 via an elongated flexible member 15, for instance a string or cable, which with a first end 15A is connected to the bearing arm 12, in a way to be described below, and with its opposite end 15B is connected to a cover plate 17, sitting on top of the spring 8. The spring 8 is compressed between the cover plate 17 and the bearing 16, thereby pre-tensioning the string 15 with a spring force $F_s$. Preferably, the string 15 is adjustably connected to the cover plate 17, for instance by means of a clamping element or a threaded connection 21, so that the magnitude of the pretension $F_s$ can be adjusted. In the illustrated embodiment, the spring 8 is mounted on the subframe 13 by means of a bearing 16, e.g. a ball bearing, allowing the spring to rotate around its centre line S, thereby preventing the spring 8 from becoming twisted during use, which would affect its stiffness. It will be appreciated that to that end the bearing 16 may also be incorporated in the cover plate 17 on top of the spring 8 (not shown). Furthermore, a guiding means (not shown) may be provided between the bearing 16 and cover plate 17, so as to keep the spring 8 axially aligned during use. Such a guiding means may for instance not be needed when applying a steel coil compression spring with flat ends.

The string 15 extends from the cover plate 17 centrally through the spring 8 and through an opening in the subframe leg 13B. From there, the string 15 is guided towards the bearing arm 12 via guiding means 14, so as to include an angle α with the spring centre line S, and connected to said arm 12 via a swivel arm 19, which is pivotally connected to the bearing arm 12, around a third pivot axis $R_3$, extending in line with the spring centre line S. Drive means 20 are provided, such as an electric, pneumatic or hydraulic piston, arranged to rotate the swivel arm 19, causing the string end 15A, and hence the point of application of the spring force $F_s$ onto the bearing arm 12, to travel a circular path C, as indicated in dashed lines. The length of the swivel arm 19 and hence the radius r of the circular path C will affect the minimum and maximum counter acting moment $M_s$ attainable with the anti-roll/pitch system. For maximum adjustability, said radius r is preferably chosen to be slightly smaller than half the bearing arm length L, as will be explained below.

The suspension 7, 10 operates as follows. Under static load conditions, when the vehicle 1 stands still or rides stationary and no acceleration or deceleration forces act on the cabin 6, the suspension 7,10 takes on a neutral position as shown in FIG. 2, wherein the bearing arm 12 extends substantially horizontally and the swivel arm 19 extends substantially parallel to the first and second pivot axes $R_{1,2}$. In this position, the bearing arm 12 will have to support a load P that equals approximately one fourth of the cabin weight, assuming the cabin 6 is supported by four suspensions 7,10, as shown in FIGS. 1A,B. The spring force $F_s$ and angle α are chosen such that a moment $M_s = F_{sv}*q$, exerted on the bearing arm 12 by the vertical component of the spring force $F_s$ equals the moment $M_p = P*L$, exerted on the bearing arm 12 by said static load P, wherein $F_{sv} = F_s * \cos α$ and q and L are the respective distances from the forces $F_{sv}$ and P to the second rotation axis $R_2$.

It will be appreciated that in case of thy vehicle being unequally loaded, the anti-roll/pitch system may be used as a load levelling system, wherein the spring force $F_s$ of the individual suspension systems may be set differently, to balance said unequal load distribution.

Under dynamic load conditions, when the vehicle 1 accelerates, decelerates and/or negotiates bends, an additional dynamic load $\Delta P$ and moment $\Delta M_p$ will act on the bearing arm 12, as illustrated in FIG. 2. In the absence of an anti-roll/pitch system 10 according to the invention, this would cause the cabin 6 to undergo a pitching and/or rolling motion as explained with regard to FIGS. 1A,B. With an anti-roll/pitch system 10 according to the invention, this additional load $\Delta P$ can be counteracted by having the drive means 20 rotate the swivel arm 19 either clockwise (in the direction of arrow A) or counter clockwise (in the direction of arrow B) thereby decreasing, respectively increasing the distance q between the vertical spring force component $F_{sv}$ and the second pivot axis $R_2$, and hence the counteracting moment $M_s = F_{sv}*q$ on the bearing arm 12, so as to balance the additional dynamic moment $\Delta M_p$.

From this it will be appreciated that if the radius r of the circular path C is chosen to equal approximately half the bearing arm length L, full use can be made of the available bearing arm length L when adjusting the counteracting moment $M_s$. This moment $M_s$ can then be varied between a minimum wherein the moment approaches zero and a maximum wherein the moment approaches $F_{sv}*L$, by respectively rotating the swivel arm 19 over about 90° from its neutral position shown in FIG. 2 in the direction of arrow A and B. This will cause the distance q between the spring force $F_{sv}$ and the second pivot axis $R_2$ to be reduced to approximately zero, respectively L, i.e. the length of the bearing arm 12.

In the case where the counteracting moment $M_s$ is approximately zero, it will be possible to disconnect the first mass 6, for instance for maintenance purposes of the system.

To control the drive means 20, and rotate the swivel arm 19 over an appropriate angle, sensors 30 may be provided to measure the dynamic load acting on the cabin 6, for instance by means of a force, acceleration, velocity and/or displacement measurement. Furthermore, a central control unit 35 may be provided, equipped with an algorithm to calculate on the basis of said measured data the instantaneous string position needed to compensate for the dynamic load, and to control the drive means 20 so as to effectuate this position by rotating the swivel arm 19. Thus, dynamic loads on the cabin 6 can be compensated by adjusting the swivel arm 19, wherein the string 15, at least the part thereof extending between the swivel arm 19 and the spring 8 will describe a cone, with a top angle of 2*α and the spring 8 can remain substantially stationary, requiring no additional space. As the string diameter is small, the cone described by said string will only take up little space, rendering the anti-roll/pitch system 10 according to the invention a compact, easy to implement system.

In a very preferred embodiment the spring 8 may be tilted or tiltable to a position in which its centre line S extends approximately in line with the elongated member 15, so that the elongated member 15 will be substantially free of bends. This may help to reduce or prevent wear and as such can increase the lifetime of said member 15. It may furthermore allow the system to take on an even more compact configuration, to meet additional space restrictions. Preferably this alignment of the spring 8 and flexible member 15 occurs under static load conditions, as shown in FIG. 2, wherein the bearing arm 12 extends substantially horizontally and the swivel arm 19 extends substantially parallel to the second pivot axis $R_2$ of the bearing arm 12. Alternatively, the orientation of the spring may be adjustable, allowing the occurrence of said aligned condition to be realized with other positions of the flexible, elongated member 15.

The string or cable 15 can for instance be made of metal, in particular steel, or a high tensile strength material, such as Aramide fibres or the like. Instead of a compression spring 8, as illustrated, a tensile spring may be used to pre-tension the string 15.

The guiding means 14 are preferably made of, or covered with low friction material, such as Teflon™, and provided with a rounded contact surface. This will minimize the contact area and friction between the string 15 and the guiding means 14, which is beneficial for the lifetime of said components, as well as the force and energy needed to rotate the swivel arm 19. Alternatively the guiding means 14 can for instance be provided with a bearing race, while the string 15 can be provided with a ball or comparable element, adapted to roll within said bearing race.

Due to the direct contact between the string 15 and the guiding means 14, high frequent vibrations occurring in the chassis 2 during use may be transferred to the cabin 6, via the subframe 13, guiding means 14 and string 15. To prevent this problem, a resilient layer 18, made of for instance natural or synthetic rubber, may be mounted between the subframe 13 and the chassis 2, as illustrated in FIG. 2, capable of absorbing or at least damping said vibrations.

Figure 1B:
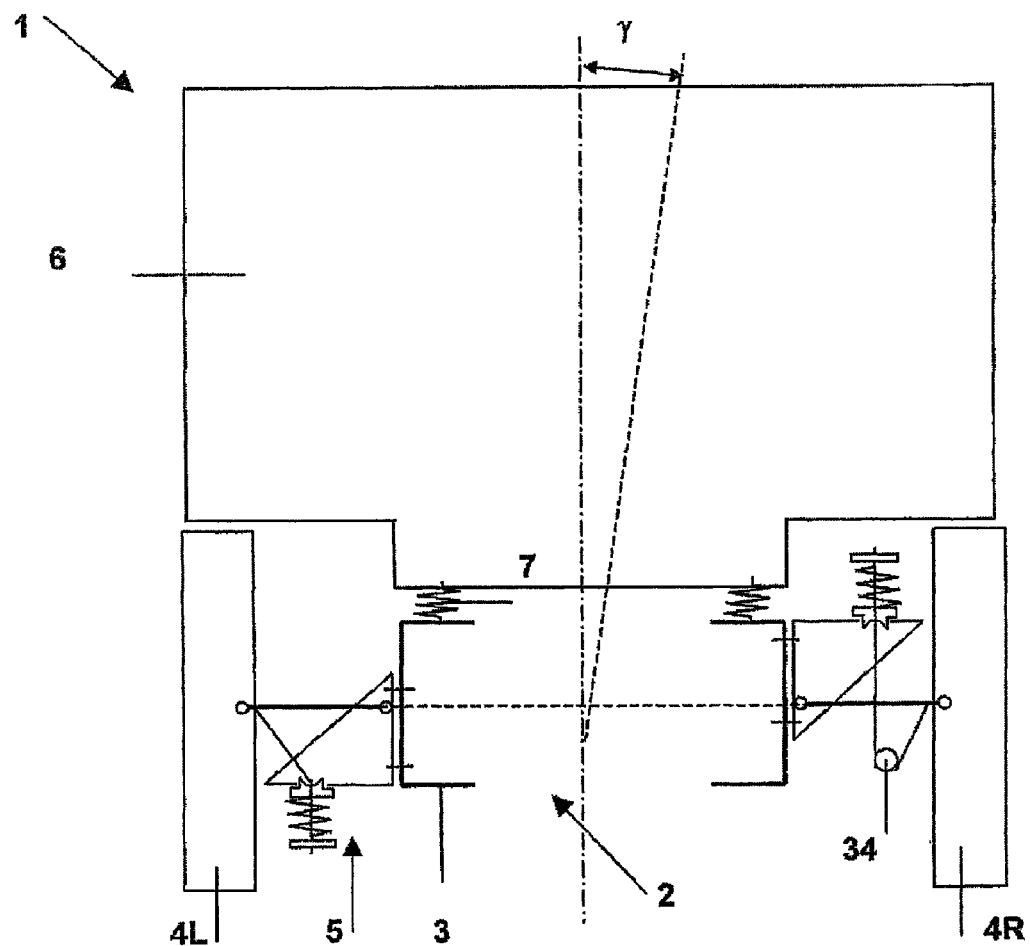
Figure 2:
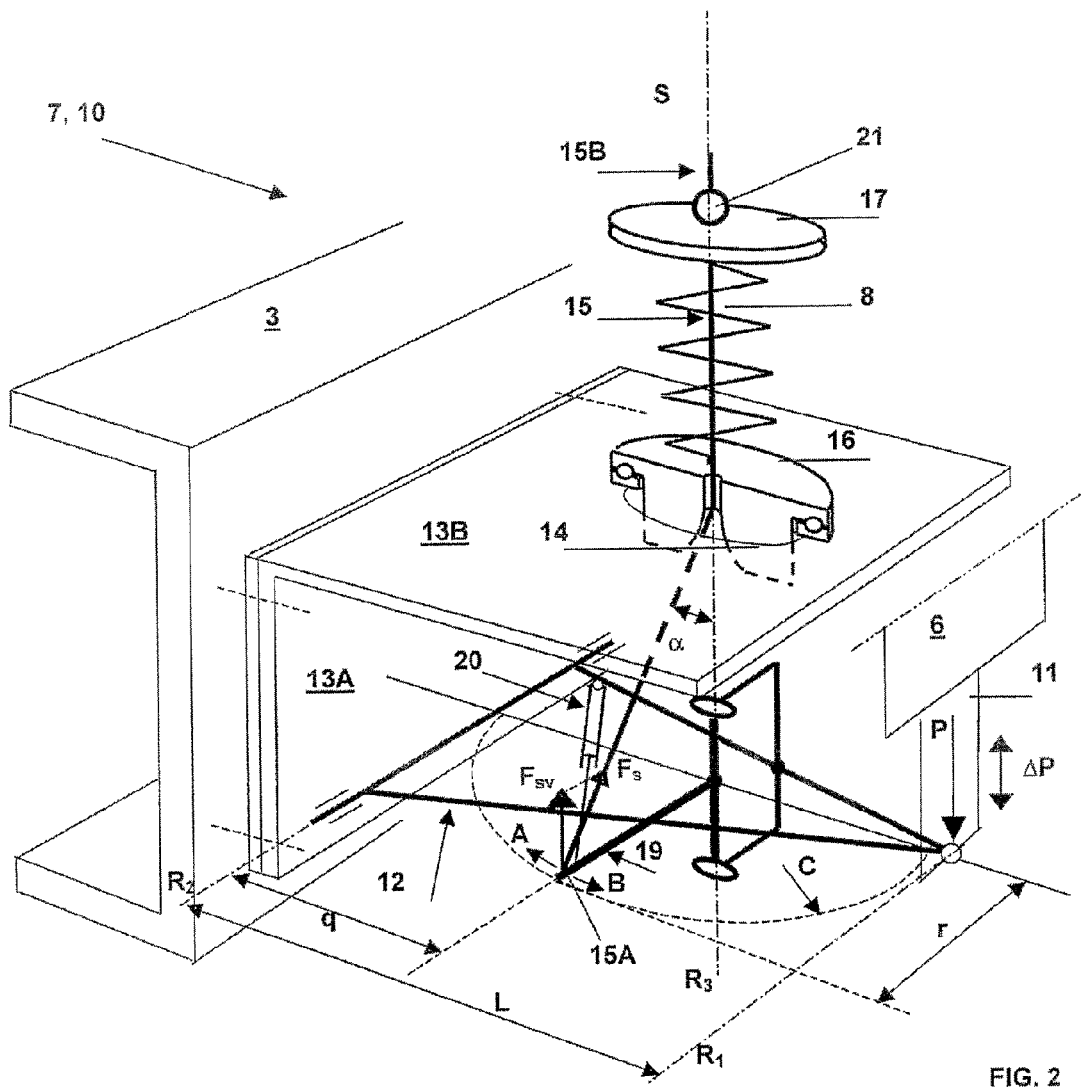
FIG. 2 shows in perspective view a first embodiment of an anti-roll/pitch system according to the invention, in a neutral position.

Preferably, the cabin 6 is connected to the bearing arm 12 via a leaf spring 11, which is cantilevered in said cabin 6, as best seen in FIGS. 1B and 2. Such leaf spring 11 is stiff in a direction parallel to the first and second pivot axes $R_{1,2}$, yet allows the cabin 6 to move in upward, downward and sideward direction, i.e. perpendicular to said pivot axes $R_{1,2}$, thereby allowing the bearing arm 12 to oscillate around the second pivot axis $R_2$, upon oscillation of spring 8, during use.

Figure 3:
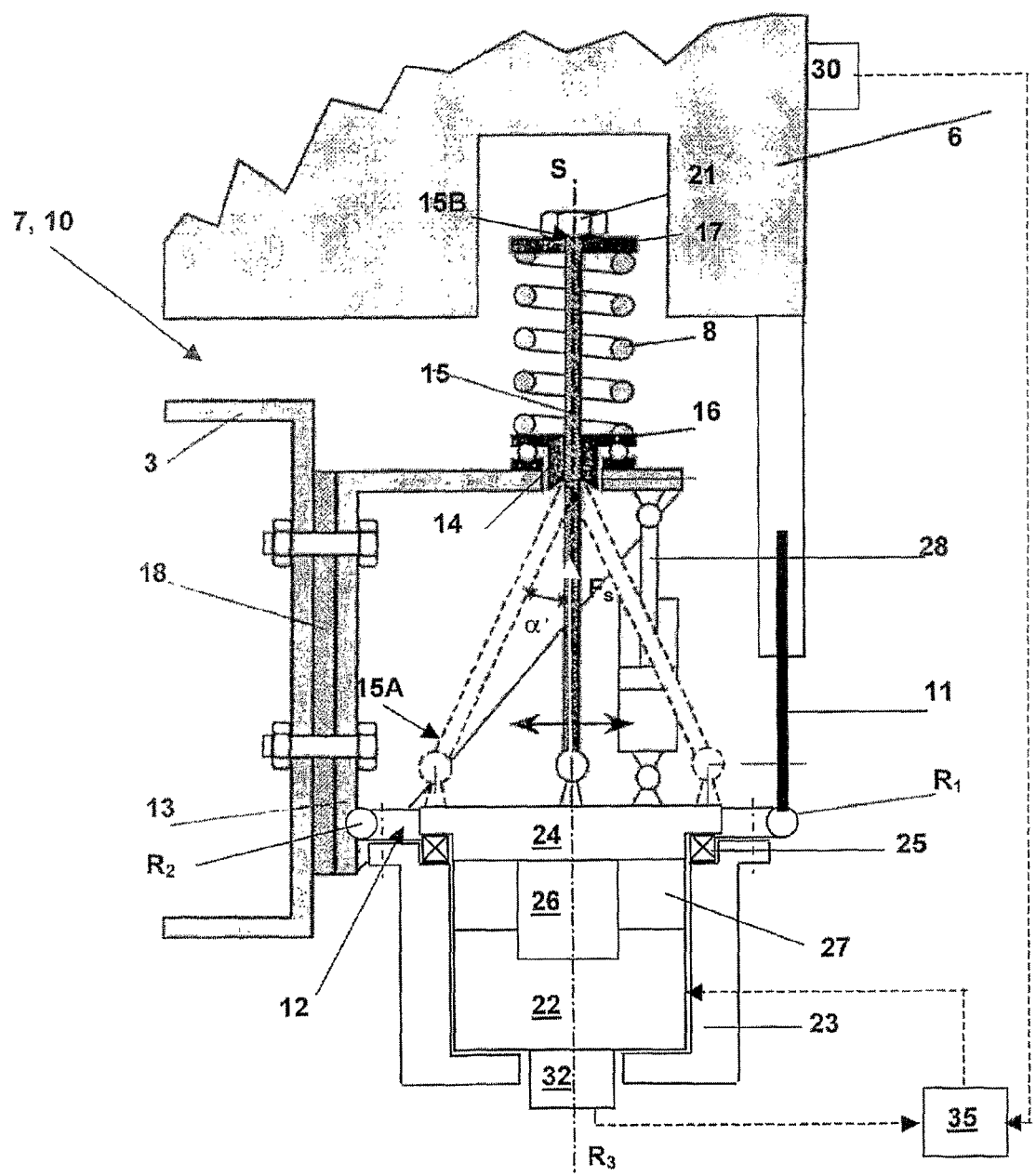
FIG. 3 shows the anti-roll/pitch system of FIG. 2, in cross sectional view, and with alternative adjusting means.

FIG. 3 shows an alternative embodiment of an anti-roll/pitch system 10 according to the invention, wherein like parts have been denoted with like reference numerals. The embodiment mainly differs from the one shown in FIG. 2 in that the swivel arm 19 and piston assembly 20 are replaced by an electric motor 22, which is connected to the bearing arm 12 via a frame 23. The string 15 is eccentrically coupled to a shaft 24 of the motor 22, which is preferably supported on the bearing arm 12 by a cross roller bearing 25 or the like, capable of supporting the shaft 24 against axial and radial forces as well as a bending moment, which during use may be exerted on said shaft 24 by the pre-tensioned string 15. Reduction means 27 may be provided, enabling the shaft 24 to be driven with a desired couple and velocity. The system 10 operates in a similar way as described with regard to FIG. 2.

It will be appreciated, that thanks to the use of a flexible string 15, no complicated pivot hinge or other coupling means are required to connect the string 15 to the shaft 24. Instead, the string 15 may be simply connected to the shaft 24 via a clamp construction or the like, thereby contributing to the simplicity of the anti-roll/pitch system 10.

In a preferred embodiment, the motor 22 can be provided with a hold provision 26, to shut down the motor 22 when the load thereon exceeds a predetermined value. This may happen when a rotation angle of the bearing arm 12 around its second pivot axis $R_2$ exceeds a certain value, due to oscillations of the spring 8. At such a large rotation angle, components of the spring force $F_s$ increase the load on the motor 22, requiring the motor to exert a larger couple and consume more energy to adjust the string position. Therefore, in a preferred embodiment the central control unit 35 may be arranged to activate the hold provision when the rotation angle of the bearing arm 12 around the second pivot axis $R_2$ exceeds a certain value, thereby relieving the motor 22. When the rotation angle returns in a predetermined, acceptable working range, the motor 22 can be activated again, so as to resume adjustment of the string position. As such, energy consumption of the system 10 can be optimised.

In a further preferred embodiment, the motor 22 can be provided with an encoder or comparable measurement means 32, to measure the position of the driven shaft 24. This information may be used by the central control unit 35 when controlling the motor 22, to adjust the string position.

The system 10 may further comprise damping means 28, mounted between the bearing arm 12 and the subframe 13. Although not shown, the embodiment of FIG. 2 may comprise a similar damping provision.

In the above given examples the anti-roll/pitch system 10 has been illustrated as applied to a secondary suspension 7, between the chassis 2 and cabin 6. It will be clear, that the anti-roll/pitch system 10 can be applied on other vehicle suspensions in a comparable way, notably the primary suspension 5 between the chassis 2 and wheels 4, In that case the orientation of the spring 8 and string 15 may be reversed as compared to the orientation of the system shown in FIGS. 2 and 3, thereby allowing the system to withstand external pressure forces. This is schematically illustrated in FIG. 1B, for the left side wheel 4L. Alternatively, additional guiding means 34 may be applied to guide the elongated member 15 so as to subject the bearing arm 12 to a downward pulling force instead of an upward pulling spring force $F_s$, as schematically illustrated in FIG. 1B, for the right side wheel 4R.

The invention is not in any way limited to the exemplary embodiments presented in the description and drawings. Combinations (of parts) of embodiments shown and described in this description are explicitly understood to fall within the scope of the invention as well. Moreover, many variations are possible within the scope of the invention, as outlined by the claims.

What is claimed is:

1. Anti-roll/pitch system (10) for use in a vehicle (1), in which a first vehicle mass (4, 6) is suspended to a second vehicle mass (2, 3) by means of a bearing arm (12), which is pivotally connected to said second vehicle mass (2, 3) around a pivot axis ($R_2$) by means of spring means (8), said anti-roll/pitch system (10) comprising adjusting means (19, 20; 22, 24), for adjusting a point of application of a spring force ($F_s$) on the bearing arm (12) relative to the pivot axis ($R_2$), thereby adjusting a moment ($M_s$) exerted by said spring force ($F_s$) on said bearing arm (12), in order to counteract a load (P, $\Delta$P) exerted on the bearing arm (12) by the first vehicle mass (4, 5), wherein the spring force ($F_s$) is exerted on the bearing arm (12) through a flexible, elongated member (15), wherein guiding means (14) are provided for guiding the flexible, elongated member (15), so as to have at least one section extending in line with a centre line (S) of the spring means (8) and at least one further section including an angle ($\alpha$) with said centre line (S).

2. System according to claim 1, wherein a contacting surface of the guiding means (14) and/or the elongated member (15) is provided with friction reducing means, to be received in an appropriate guiding race at the guiding means (14).

3. System according to claim 1, wherein one end (15B) of the flexible, elongated member (15) is connected to the spring means (8) and the other end (15A) is movably connected to the bearing arm (12) in such way, that this end (15A) can travel a circular path (C).

4. System according to claim 3, wherein a centre line ($R_3$) of the circular path (C) coincides with a centre line (S) of the spring means (8).

5. System according to claim 3, wherein a centre line ($R_3$) of the circular path (C) extends substantially perpendicular to the bearing arm (12).

6. System according to claim 5, wherein the centre line ($R_3$) extends approximately halfway the bearing arm's length (L) and the circular path (C) has a radius (r) which is slightly smaller than half the bearing arm's length (L).

7. System according to claim 1, wherein the centre line (S) of the spring means (8) extends in line with the flexible elongated member (15) for at least one of the possible positions the elongated member (15) can assume while traveling the circular path (C).

8. System according to claim 1, wherein the adjusting means comprise a swivel arm (19) or disc (24), which is pivotally connected to the bearing arm (12), around a pivot axis ($R_3$), and drive means (20, 22) for rotating said swivel arm (19) or disc (24) around said pivot axis ($R_3$), wherein the flexible, elongated member (15) is connected to the swivel arm (19) or disc (24) at a distance (r) from the pivot axis ($R_3$).

9. System according to claim 1, comprising at least one sensor (30) for measuring a parameter representative for the load on the bearing arm (12).

10. System according to claim 1, wherein second adjusting means are provided, arranged to pre-tension the spring means (8), so as to adjust the spring force ($F_s$), acting on the elongated member (15) under static conditions.

11. Built-in unit comprising a subframe (13), a bearing arm (12) which is pivotally connected to the subframe (13) around a pivot axis ($R_2$) by means of spring means (8) and an anti-roll/pitch system (10), having the features of an anti-roll/pitch system (10) according to claim 1.

12. Vehicle, comprising a first vehicle mass, a second vehicle mass, and a built in unit according to claim 11, said unit being connected to the second vehicle mass (2), so that the bearing arm (12) supports the first vehicle mass (6, 4).

13. Vehicle, comprising a first vehicle mass, a second vehicle mass, and an anti-roll/pitch system wherein the anti-roll/pitch system includes a first vehicle mass (4, 6) suspended to a second vehicle mass (2, 3) by means of a bearing arm (12), which is pivotally connected to said second vehicle mass (2, 3) around a pivot axis ($R_2$) by means of spring means (8), said anti-roll/pitch system (10) including adjusting means (19, 20; 22, 24), for adjusting a point of application of a spring force ($F_s$) on the bearing arm (12) relative to the pivot axis ($R_2$), thereby adjusting a moment ($M_s$) exerted by said spring force ($F_s$) on said bearing arm (12), in order to counteract a load (P, ΔP) exerted on the bearing arm (12) by the first vehicle mass (4, 5), wherein the spring force ($F_s$) is exerted on the bearing arm (12) through a flexible, elongated member (15), wherein guiding means (14) are provided for guiding the flexible, elongated member (15), so as to have at least one section extending in line with a centre line (S) of the spring means (8) and at least one further section including an angle (α) with said centre line (S), wherein the bearing arm (12) is connected to the first vehicle mass (6, 4) via a leaf spring (11), orientated such that displacement of the first vehicle mass (6, 4) in a direction parallel to the bearing arm's pivot axis ($R_2$) is prevented, while allowing displacement of the first vehicle mass (6, 4) in a direction perpendicular to said pivot axis ($R_2$).

14. Vehicle according to claim 13, wherein a resilient element (18) is provided between the bearing arm (12) and the second vehicle mass (2), to prevent direct contact therebetween, and attenuate high frequent vibrations which during use may be transferred between said second vehicle mass (2) and the bearing arm (12).

\* \* \* \* \*

UNITED STATES PATENT AND TRADEMARK OFFICE
CERTIFICATE OF CORRECTION

| | | |
|---|---|---|
| PATENT NO. | : 7,845,660 B2 | Page 1 of 1 |
| APPLICATION NO. | : 11/660529 | |
| DATED | : December 7, 2010 | |
| INVENTOR(S) | : van der Knaap | |

It is certified that error appears in the above-identified patent and that said Letters Patent is hereby corrected as shown below:

ON THE COVER PAGE:

Item "(74) Attorney, Agent, or Firm—Hoffman & Baron, LLP"

Should read: -- (74) Attorney, Agent or Firm—Hoffmann & Baron, LLP --

Signed and Sealed this
Thirtieth Day of August, 2011

David J. Kappos
*Director of the United States Patent and Trademark Office*